(12) United States Patent
Cheng

(10) Patent No.: US 11,226,718 B2
(45) Date of Patent: Jan. 18, 2022

(54) METHOD AND MOBILE TERMINAL FOR UTILIZING AREA NEAR OPENINGS IN DISPLAY SCREEN TO DISPLAY APPLICATION ICON

(71) Applicant: GUANGDONG OPPO MOBILE TELECOMMUNICATIONS CORP., LTD., Guangdong (CN)

(72) Inventor: Jiao Cheng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/934,840

(22) Filed: Jul. 21, 2020

(65) Prior Publication Data

US 2020/0348823 A1    Nov. 5, 2020

Related U.S. Application Data

(63) Continuation of application No. PCT/CN2019/073830, filed on Jan. 30, 2019.

(30) Foreign Application Priority Data

Feb. 2, 2018   (CN) .......................... 201810108439.4

(51) Int. Cl.
*G06F 3/0481* (2013.01)
*G06F 3/0482* (2013.01)
(Continued)

(52) U.S. Cl.
CPC ........ *G06F 3/04817* (2013.01); *G06F 3/0482* (2013.01); *H04M 1/0264* (2013.01); *H04M 1/72469* (2021.01); *G06F 2203/04803* (2013.01)

(58) Field of Classification Search
CPC ............... G06F 3/04817; G06F 3/0482; G06F 2203/04803; G06F 1/1686; G06F 9/451;
(Continued)

(56) References Cited

U.S. PATENT DOCUMENTS

D801,388  S  * 10/2017  Sun ............................. D14/492
2016/0147293 A1* 5/2016  Park ...................... G06F 1/1694
381/334
2018/0017996 A1   1/2018  Ryu et al.

FOREIGN PATENT DOCUMENTS

CN          103425376 A       12/2013
CN          103984470 A        8/2014
(Continued)

OTHER PUBLICATIONS

International search report PCT/CN2019/073830, dated Apr. 28, 2019 (2 pages).
(Continued)

*Primary Examiner* — Nicholas Ulrich
(74) *Attorney, Agent, or Firm* — Young Basile Hanlon & MacFarlane, P.C.

(57) ABSTRACT

A method for display in a mobile terminal is disclosed. The mobile terminal includes a display screen, the display screen is configured for displaying an application icon, defines an opening, and includes a display area, and the opening is located in the display area. The method includes displaying the application icon at a location of the opening in the display area, wherein a wall of the display screen in the opening has a projection located in the application icon.

18 Claims, 10 Drawing Sheets

(51) Int. Cl.
*H04M 1/72469* (2021.01)
*H04M 1/02* (2006.01)

(58) Field of Classification Search
CPC ........... H04M 1/72469; H04M 1/0266; H04M 1/0264
See application file for complete search history.

(56) References Cited

FOREIGN PATENT DOCUMENTS

| | | |
|---|---|---|
| CN | 106850897 A | 6/2017 |
| CN | 206400421 U | 8/2017 |
| CN | 107145192 A | 9/2017 |
| CN | 107580092 A | 1/2018 |
| KR | 20150083819 A | 7/2015 |

OTHER PUBLICATIONS

First Office Action from China patent office in a counterpart Chinese patent Application 201810108439.4, dated Dec. 24, 2019 (11 pages).
Xixizhengli, iphonex can not show bangs wallpaper, iphonex hidden bangs wallpaper, https://m.baidu.com/ala/c/s/m.cr173.com/mipw/201808.html, Nov. 7, 2017, pp. 1-3.
Second Office Action from China patent office and English translation in a counterpart Chinese patent Application 201810108439.4, dated Jul. 16, 2020 (16 pages).
Extended European Search Report for EP Application 19748339.9 dated Feb. 8, 2021. (8 pages).
Indian Examination Report for IN Application 202017032915 dated Aug. 31, 2021. (6 pages).

* cited by examiner

METHOD AND MOBILE TERMINAL FOR UTILIZING AREA NEAR OPENINGS IN DISPLAY SCREEN TO DISPLAY APPLICATION ICON

CROSS-REFERENCE TO RELATED APPLICATION(S)

This application is a continuation application of International (PCT) Patent Application No. PCT/CN2019/073830, filed on Jan. 30, 2019, which claims priority to Chinese Patent Application No. 201810108439.4, filed on Feb. 2, 2018, the content of both of which are herein incorporated by reference in their entireties.

TECHNICAL FIELD

The present disclosure generally relates to the technical field of mobile terminal, and in particular to a method for display and a mobile terminal.

BACKGROUND

In current mobile terminals, for example, smart phones, in order to realize various functions, components such as a camera, an infrared sensor, and a light sensor are usually arranged on the front panel. In order to ensure normal operations of these components, it is necessary to make holes on the front panel and arrange these components under the holes, so that the components under the holes can obtain external information through the holes.

SUMMARY

Embodiments of the present disclosure provide a method for display in a mobile terminal including a display screen, the display screen being configured for displaying an application icon, defining an opening, and including a display area, and the opening being located in the display area and spaced apart from an edge of the display area, including: displaying the application icon at a location of the opening in the display area, wherein a wall of the display screen surrounding the opening has a projection located in the application icon.

Embodiments of the present disclosure further provide a mobile terminal, including: a display screen defining an opening and including a display area, the opening being located in the display area and spaced apart from an edge of the display area; and a processor configured for executing a computer program to cause the display screen to display the application icon at a location of the opening in the display area, wherein a wall of the display screen surrounding the opening has a projection located in the application icon.

Embodiments of the present disclosure further provide another mobile terminal, including: a display assembly including: a display layer having a display area and having an ability of displaying an application icon; and a light-shielding layer disposed on the display layer and defining an opening spaced apart from an edge of the display layer, wherein a wall of the light-shielding layer surrounding the opening has a projection on the display layer, and the projection is located in the display area; a non-transitory storage medium storing a computer program; and a processor configured for executing a computer program to control the application icon displayed at the projection such that the opening is covered by the application icon.

BRIEF DESCRIPTION OF DRAWINGS

In order to make the technical solution described in the embodiments of the present disclosure clearer, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

Figure 1:
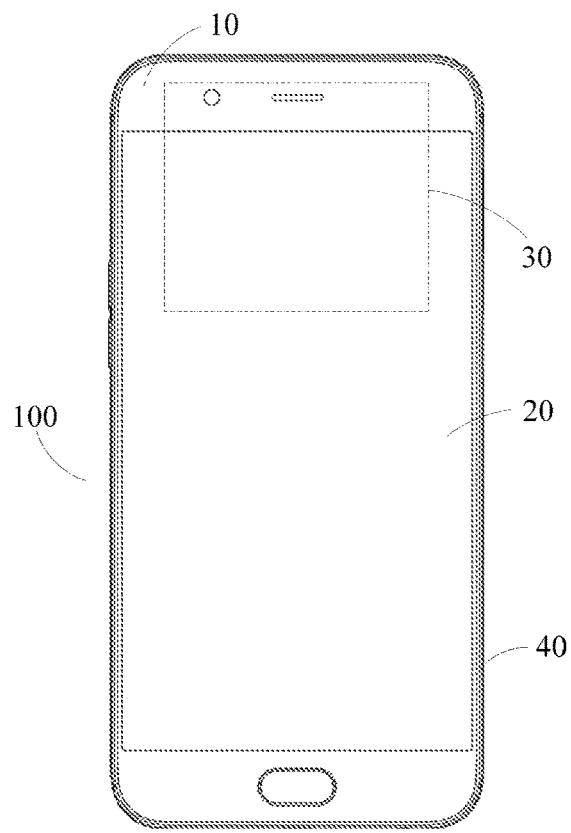
FIG. 1 is a first schematic structural diagram of a mobile terminal according to some embodiments of the present disclosure.

Embodiments of the present disclosure are described in detail below, and examples of the embodiments are shown in the drawings, in which the same or similar reference numerals indicate the same or similar elements or elements having the same or similar functions. The embodiments described below with reference to the drawings are examples, and are only used to explain the present disclosure, and cannot be construed as limitation of the present disclosure.

Embodiments of the present discloses provide a method for display in a mobile terminal including a display screen, the display screen being configured for displaying an application icon, defining an opening, and including a display area, and the opening being located in the display area and spaced apart from an edge of the display area, including: displaying the application icon at a location of the opening in the display area, wherein a wall of the display screen surrounding the opening has a projection located in the application icon.

In some embodiments, the displaying the application icon at a location of the opening in the display area includes: displaying the application icon at the location of the opening in the display area according to feature information of the opening.

In some embodiments, before the displaying the application icon at a location of the opening in the display area according to feature information of the opening, the method includes acquiring the feature information of the opening, the feature information of the opening including at least one of shape information and location information of the opening; and selecting the application icon from a plurality of preset application icons in the mobile terminal according to the at least one of shape information and location information of the opening.

In some embodiments, the feature information of the opening includes the shape information of the opening; each preset application icons includes at least one dark region; and the selecting the application icon from a plurality of preset application icons in the mobile terminal includes: acquiring display information of the at least one dark region of each preset application icon; comparing the display information of the at least one dark region of each preset application icon with the shape information of the opening to obtain a comparing result; and selecting the application icon according to the comparing result.

In some embodiments, the comparing the display information of the at least one dark region of each preset application icon with the shape information of the opening includes: determining a size of each of the at least one dark region of the each preset application icon according to the display information of the at least one dark region of the each preset application icon; and determining whether a size of the opening is less than or equal to the size of the each of the at least one dark region of the each preset application icon.

In some embodiments, the feature information of the opening includes the location information of the opening; the application icon includes at least one dark; and the displaying the application icon at a location of the opening in the display area includes: superimposing at least one of the at least one dark region of the application icon onto the location of the opening according to the location information of the opening such that the projection of the wall of the display screen surrounding the opening is located in the application icon.

In some embodiments, the displaying the application icon at a location of the opening in the display area further includes: dividing a sub-area closing to the opening in the display area as an icon-area, wherein the application icon is located in the icon-area; and displaying at least another application icon in the icon-area.

In some embodiments, after the displaying at least another application icon in the icon-area, the method further includes receiving a replacement instruction, the replacement instruction being configured for indicating to replace the application icon and the at least another application icon that are originally displayed in the icon-area; acquiring a plurality of preset to-be-displayed icons in response to the replacement instruction, wherein the plurality of preset to-be-displayed icons includes at least one application icon that is selected from the plurality of preset application icons according to the at least one of shape information and location information of the opening; and displaying the plurality of preset to-be-displayed icons in the icon-area, wherein one of the at least one application icon is displayed at the location of the opening.

In some embodiments, the icon-area has a background, and the background of the icon-area has a dark color.

In some embodiments, the opening closes a side of the display screen, and the icon-area is adjacent to the side of the display screen.

In some embodiments, the application icon is a camera application icon.

In some embodiments, the opening has a shape of circle, and the application icon includes an inner frame and an outer frame that are axisymmetric and center-symmetric with a same symmetry-center; and a center of the shape of circle and the symmetry-center are located in a direction perpendicular to the display area.

Embodiments of the present disclosure provide a mobile terminal, including: a display screen defining an opening and including a display area, the opening being located in the display area and spaced apart from an edge of the display area; and a processor configured for executing a computer program to cause the display screen to display the application icon at a location of the opening in the display area, wherein a wall of the display screen surrounding the opening has a projection located in the application icon.

In some embodiments, the opening has feature information including at least of shape information and location information; and the application icon is selected from a plurality of preset application icons according to the at least one of shape information and location information of the opening.

In some embodiments, the application icon includes at least one dark region; and the application icon is selected in response to at least one of the at least one dark region of the application icon being matched with the shape information of the opening.

In some embodiments, the at least one of the at least one dark region of the application icon being matched with the shape information of the opening indicates that the at least one of the at least one dark region has an area greater than or equal to an area of the opening; and the at least one of the at least one dark region is superimposed onto the opening.

In some embodiments, the display area has a sub-area closing to the opening, the sub-area is configured for displaying at least another application icon.

In some embodiments, the sub-area has a background, and the background of the sub-area has a dark color.

In some embodiments, the processor is further configured for executing the computer program to replace the application icon and the at least another application icon in the sub-area in response to a replacement instruction.

Embodiments of the present disclosure provide another mobile terminal, including: a display assembly including: a display layer having a display area and having an ability of displaying an application icon; and a light-shielding layer disposed on the display layer and defining an opening spaced apart from an edge of the display layer, wherein a wall of the light-shielding layer surrounding the opening has a projection on the display layer, the projection is located in the display area; a non-transitory storage medium storing a computer program; and a processor configured for executing a computer program to control the application icon displayed at the projection such that the opening is covered by the application icon.

FIG. 1 is a first schematic structural diagram of a mobile terminal according to some embodiments of the present disclosure. The mobile terminal 100 is, for example, an electronic device such as a mobile phone or a tablet computer. It can be understood that the mobile terminal 100 includes, but is not limited to, these in this embodiment. The mobile terminal 100 includes a cover plate 10, a display assembly 20, a circuit board 30, and a housing 40.

The cover plate 10 is installed on the display assembly 20 to cover the display assembly 20. The cover plate 10 may be a transparent glass cover plate. In some embodiments, the cover plate 10 may be a glass cover plate made of sapphire.

The display assembly 20 is arranged in the housing 40 to form a display surface of the mobile terminal 100. The display assembly 20 is used as a front surface of the mobile terminal 100, an enclosed space is formed by the housing 40 and the front surface, and the enclosed space is used for accommodating other electronic components of the mobile terminal 100. At the same time, the display surface of the mobile terminal 100 formed by the display assembly 20 is used for displaying information such as images and text.

The circuit board 30 is arranged inside the housing 40, and the circuit board 30 is accommodated in the above-mentioned enclosed space. The circuit board 30 may be a main board of the mobile terminal 100. The circuit board 30 is provided with a grounding point for realizing the grounding of the circuit board 30. The circuit board 30 may be integrated with function components such as a camera and a processor. Meanwhile, the display assembly 20 can be electrically connected to the circuit board 30.

In some embodiments, a display control circuit is arranged on the circuit board 30. The display control circuit outputs electrical signals to the display assembly 20 to control the display assembly 20 to display information.

The housing 40 is used to form an external outline of the mobile terminal 100. The housing 40 may be a metal housing such as an aluminum alloy housing 40. It should be noted that the material of the housing 40 in embodiments of the present disclosure is not limited to this, but also may include other manners. For example, the housing 40 may be a ceramic middle frame or a glass middle frame. As another example, the housing 40 may be a plastic middle frame. For yet another example, the housing 40 can be a structure with metal and plastic in which the plastic can be formed onto a metal plate by injection molding.

Figure 2:
FIG. 2 is a schematic structural diagram of a housing according to some embodiments of the present disclosure.
Figure 3:
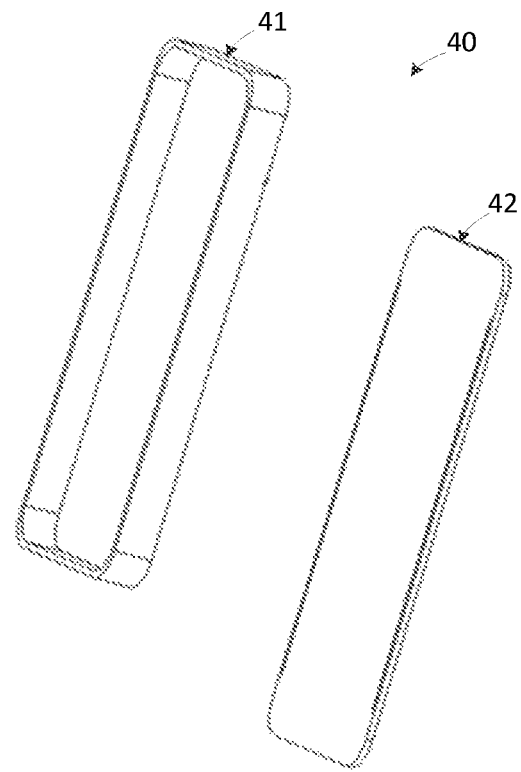
FIG. 3 is another schematic structural diagram of a housing according to some embodiments of the present disclosure.

In some embodiments, FIG. 2 is a schematic structural diagram of a housing according to some embodiments of the present disclosure. The housing 40 can be integrally formed. It should be noted that the structure of the housing 40 in embodiments of the present disclosure is not limited to this. For example, FIG. 3 is another schematic structural diagram of a housing according to some embodiments of the present disclosure. The housing 40 may include a middle frame 41 and a rear cover 42. The middle frame 41 and the rear cover 42 are fixedly connected to form the housing 40.

Figure 4:
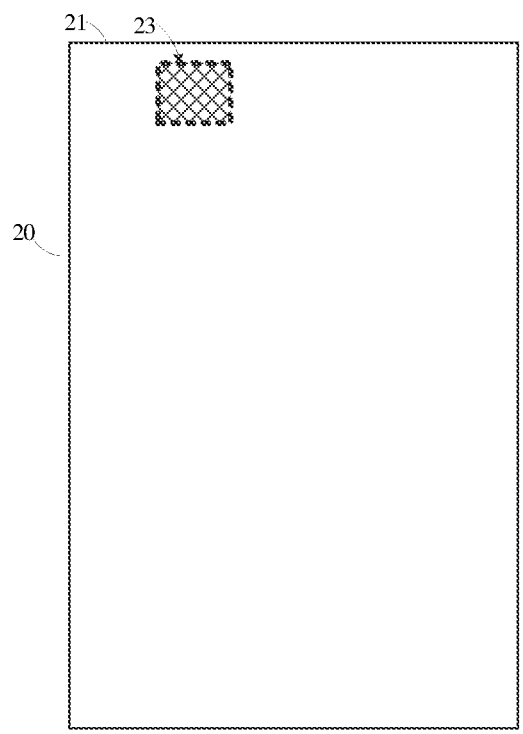
FIG. 4 is a schematic structural diagram of a display assembly according to some embodiments of the present disclosure.
Figure 5:
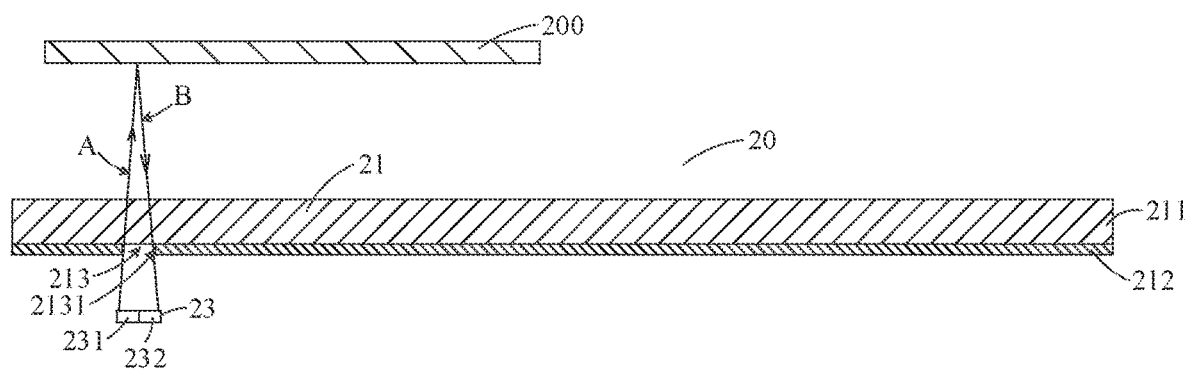
FIG. 5 is another schematic structural diagram of a display assembly according to some embodiments of the present disclosure.

In some embodiments, FIG. 4 is a schematic structural diagram of a display assembly according to some embodiments of the present disclosure, and FIG. 5 is another schematic structural diagram of a display assembly according to some embodiments of the present disclosure. The display assembly 20 may include a display screen 21 and a function component 23.

The function component 23 can emit signals through the display screen 21, and can also receive signals through the display screen 21. In some embodiments, the function component 23 may be a sensor, which may include a signal transmitter and a signal receiver. The function component 23 may also be a camera, and the camera may include a camera and a fill light. The function component 23 may also be an ambient light sensor. In some embodiments, the function component 23 is described as the sensor for an example. It should be noted that the sensor is not a limitation of the function component 23 in embodiments of the present disclosure, and may also be other devices.

In some embodiments, the display screen 21 includes a display layer 211 and a light-shielding layer 212.

The display layer 211 is used to display information such as images and text.

In some embodiments, the display screen 21 may be a liquid crystal display (LCD), an organic light-emitting diode display (OLED), or other types of display screen. When the display screen 21 is a liquid crystal display, the display layer 211 may include a backlight plate, a low polarizer, an array substrate, a liquid crystal layer, a color filter substrate, an upper polarizer, etc., which are sequentially stacked. When the display screen 21 is an organic light-emitting diode display, the display layer 211 may include a base layer, an anode, an organic layer, a conductive layer, an emission layer, a cathode, and the like that are sequentially stacked. In some embodiments, the display screen is a transparent display, which has a transparent characteristic and can be used for signals to pass through.

Figure 6:
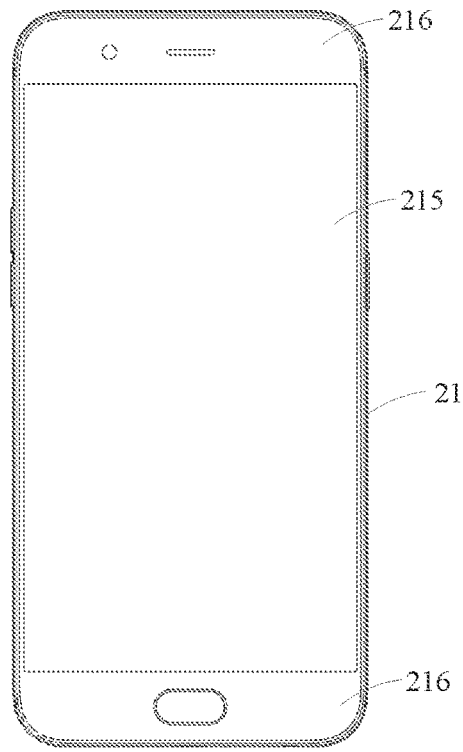
FIG. 6 is a plan view of a display screen in a display assembly according to some embodiments of the present disclosure.

FIG. 6 is a plan view of a display screen in a display assembly according to some embodiments of the present disclosure. The mobile terminal 100 has a display area 215 and a non-display area 216, and the display area 215 can be used to display a screen of the mobile terminal 100 or for a user to perform touch operation. The top area of the non-display area 216 defines an opening for sound and light transmission. Function components such as a fingerprint module, a touch button, and the like, may be arranged on the bottom area of the non-display area 216. The cover plate 10 is installed on the display screen 21 to cover the display screen 21, and has a display area and a non-display area correspondingly which are same as that of the display screen 21. Details may be referred to the display area and the non-display area of the display screen 21.

Figure 7:
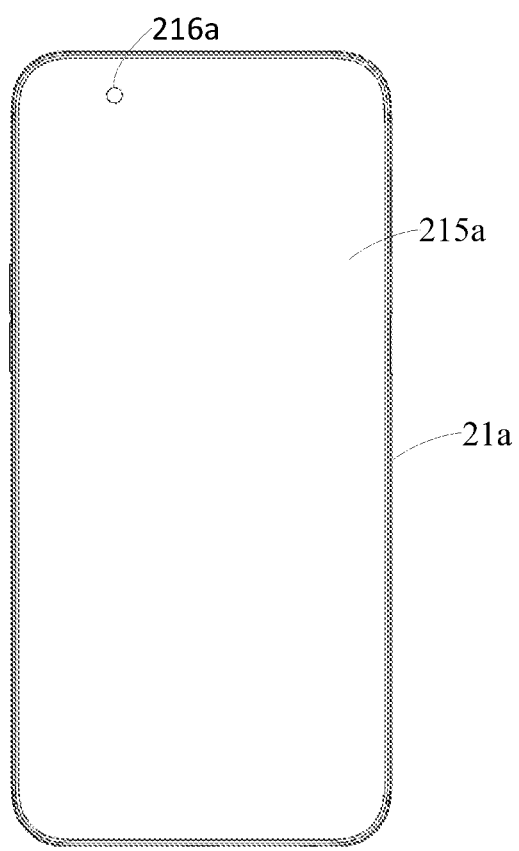
FIG. 7 is another plan view of a display screen in a display assembly according to some embodiments of the present disclosure.

It should be noted that the structure of the display screen 21 is not limited to this. For example, the display screen may be a full screen or a special-shaped screen. Specifically, FIG. 7 is another plan view of a display screen in a display assembly according to some embodiments of the present disclosure. The difference between the display screen in FIG. 7 and the display screen in FIG. 6 is that the non-display area 216a is directly formed on the display screen 21a. For example, the non-display area 216a of the display screen 21a is provided with a light-transmitting structure so that optical signals can pass through. Alternatively, the non-display area of the display screen 21a directly defines an opening or a hole for light transmission, and a front camera and a sensor may be arranged on the non-display area to take pictures and perform photoelectric detection. The display area 215a can cover the entire surface of the mobile terminal.

It should be noted that, in some embodiments of the present disclosure, there may not the non-display area, the entire surface of the display screen may be set for displaying, and an area for a sensor to perform light emission and light reception may be set on the display screen.

Figure 8:
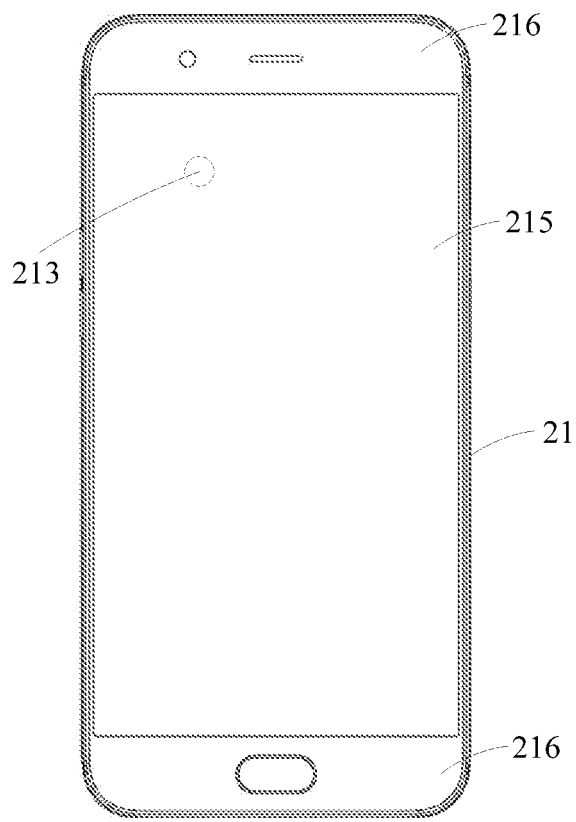
FIG. 8 is yet another plan view of a display screen in a display assembly according to some embodiments of the present disclosure.

In some embodiments, FIG. 8 is another plan view of a display screen in a display assembly according to some embodiments of the present disclosure. The light-shielding layer 212 defines an opening 213. The opening 213 allows signals to pass through, for example, optical signals and acoustic signals.

In some embodiments, the opening 213 is circular, and the diameter of the opening 213 is 2 to 4 mm. In some other embodiments, the opening 213 can also be rectangular or elliptical. It should be noted that the opening 213 may also be located at an edge of the light-shielding layer 212. The opening 213 may also be a groove structure, that is, a hatch is formed in the opening 213.

The opening 213 defined by the light-shielding layer 212 is located in the display area 215 of the display screen 21 and spaced apart from an edge of the display area 215. Specifically, as shown in FIG. 5 together, a wall 2131 of the light-shielding layer 212 surrounding the opening 213 has a projection on the display layer 211 which is located in the display area 215. Due to the opening 213, the sensor 23 can realize the proximity-sensing function of the mobile terminal 100. Thus, there is no need to separately provide another opening in the non-display area of the display screen 21.

In some embodiments, the sensor 23 includes a signal transmitter 231 and a signal receiver 232.

The signal transmitter 231 is used to emit a detection signal 'A' to outside. The detection signal 'A' is transmitted to outside through the opening 213 and through the display area 215. After the detection signal 'A' contacts an external object 200 (for example, the user's face), a reflection signal 'B' is generated. The reflection signal 'B' passes through the display area 215 and inputs the signal receiver 232 through the opening 213. In some embodiments, the signal transmitter 231 may be an infrared transmitter for emitting infrared rays.

After receiving the reflection signal T', the signal receiver 232 may output the received signal to a processor of the mobile terminal 100 for processing. Thus, the display screen of the mobile terminal 100 is controlled to be in a screen-on state or a screen-off state. In some embodiments, the signal receiver 232 may be an infrared receiver for receiving infrared rays.

It should be noted that when the opening 213 is defined in the display area of the display screen, no information can be displayed in a corresponding area no matter whether the opening 213 is used to accommodate the signal transmitter 231, the signal receiver 232, the camera, or other function components.

Embodiments of the present disclosure also relates to a method for display, which is applied for a mobile terminal.

In the embodiments of the present disclosure, a communication terminal configured to communicate through a wireless interface may be referred to as a "wireless communication terminal", a "wireless terminal", or a "mobile terminal". Examples of the mobile terminal include, but are not limited to, a satellite or cellular phone, a personal communication system (PCS) terminals that can combine cellular radiotelephones with data processing, facsimile, and data communication capabilities, a PDA including a radio-telephone, pager, Internet/intranet access, Web browser, notebook, calendar and/or global positioning system (GPS) receiver, and a conventional laptop and/or palm-type receiver or other electronic devices including a radiotelephone transceiver. The "communication terminal" (or simply "terminal") used herein includes, but is not limited to a device being configured to be connected via a wired line (such as via a public switched telephone network (PSTN), digital subscriber line (DSL), digital cable, Direct cable, and/or another data connection/network) and/or via a wireless interface (such as for cellular networks, wireless local area networks (WLAN), digital television networks such as DVB-H networks, satellite networks, AM-FM broadcast transmitters, and/or a wireless interface of another communication terminal) and for receiving/transmitting communication signals.

When the method is applied for the mobile terminal, the method may be executed in the operation system of the mobile terminal, which may include, but not limited to, the Windows operation system, Mac OS operation system, Android operation system, IOS operation system, Linux operation system, Ubuntu operation system, Windows Phone operation system, etc., and may not be limited in the embodiments of the present disclosure.

The method can be applied for the mobile terminal as described in the above embodiments. The mobile terminal includes a display screen, and the display screen can be used to display an application icon. The display screen has a display area and defines an opening, and the opening is located in the display area. The method includes actions/operations in the following.

The method displays the application icon at a location of the opening in the display area, wherein a wall of the light-shielding layer surrounding the opening has a projection on the display layer which is located in the display area.

Displaying the application icon at a location of the opening in the display area may refer to displaying the application icon on a sub-area in the display area around the opening. That is, the application icon is displayed on a sub-area in the display area having a preset distance from the opening.

In some embodiments, displaying the application icon at a location of the opening in the display area may mean that an image of the application icon is displayed around the opening when the application icon is displayed. It also refers that the opening is totally located in a display range of the application icon. That is, the opening is covered by the application icon. Alternatively, it means that the application icon is displayed on (adjacent to) a side of the opening. That is, a part of the opening is located in the display range of the application icon. Of course, in addition to the above, the position relationship between the opening and the application icon may be determined according to actual conditions.

In some embodiments, the application icon may be displayed at a location of the opening in the display area according to the feature information of the opening. Specifically, a location and/or a size of the opening can be used, so that the mobile terminal can display an application icon that is suitable for hiding the opening at the location of the opening according to the location and/or size of the opening.

For example, an area occupied by the opening in the display screen is obtained according to the feature information of the opening, i.e., the location and/or size of the opening. When the feature information of the opening is known, the mobile terminal can select an appropriate application icon to be displayed at the location of the opening, for example, an application icon with a large dark region. Thus, the color displayed in the dark region is close to the ink color of the opening, and then it is difficult for users to find the location of the opening, so as to hide (or make it difficult to find) the opening through the application icon, and this further uses the sub-area in the display area near the opening to improve the utilization rate of the display screen.

In some embodiments, when the opening is set at a location that coincides with a location where the application icon is displayed, an algorithm may be used to enable user to touch a sub-area over the opening in the display area to determine that the user actually selects the application icon corresponding to the location of the opening.

Specifically, a specific detection-area can be provided around the opening. When a touch signal is detected in the detection-area, but a touch area is smaller than a general preset value, the touch signal can still be responded to improve response sensitivity and avoid the situation where the sensitivity is reduced due to the opening.

Of course, an additional proximity sensor can be added at the location of the opening in addition to the specific detection-area set around the opening. The proximity sensor can detect user's touch operations on the application icon corresponding to the location of the opening.

Understandably, the application icon is displayed at the location of the opening in the display area, or the application icon may be displayed near the opening (within a preset range), that is, the opening may not be coincident with the location of the application icon is displayed, which can be determined according to the actual conditions.

Figure 9:
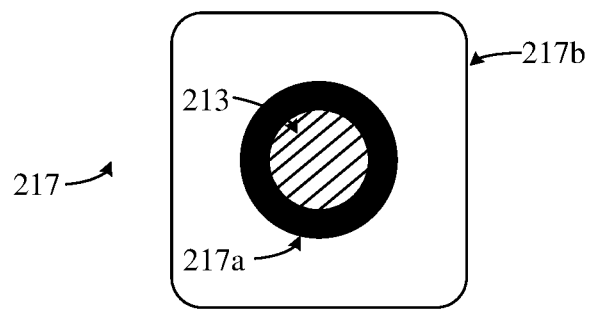
FIG. 9 is an example diagram of application icons for a method for display according to some embodiments of the present disclosure.

In some embodiments, an application icon 217 as shown in FIG. 9 may be a camera application icon 217, which is an icon corresponding to an application used for photography in the mobile terminal.

When the application icon is the camera application icon 217, the opening 213 may be located in an area where the application icon 217 is displayed. Specifically, the area may be an area in which the camera pattern in the camera application icon 217 is displayed. In this way, the ink color of the opening and feature of the camera application icon are combined to make the camera application icon 217 more concrete and improve the appearance and recognition of the application icon.

In some embodiments, specifically, as shown in FIG. 9, the opening 213 has a shape of circle, and the application icon 217 includes an inner frame 217a and an outer frame 217b. Both the inner frame 217a and the outer frame 217b are axisymmetric and are center-symmetric with a same symmetry-center. The center of the shape of circle coincides with the symmetry-center of the application icon, that is the center of the circular opening and the symmetry-center of the application icon are located in a direction perpendicular to the display area.

The shapes of the inner frame 217a and the outer frame 217b may be other shapes, such as a circle and a prism, in addition to the shapes as shown in FIG. 9, and the specific shapes may be designed according to actual conditions.

When both the inner frame 217a and the outer frame 217b are axisymmetric and are center-symmetric with a same symmetry-center, the center of the circular opening coincides with the symmetry-center of the application icon, which can make the application icon more beautiful and make the application icon more recognizable compared with that without the opening.

As mentioned above, as no information can be displayed at the sub-area over the opening in the display area, the method displays the application icon at the location of the opening in the display area. Thus, embodiments of the present disclosure can better utilize an area near the opening in the display screen to display an application icon, which improves the utilization rate of the display screen, and can effectively use the displayed application icon to hide the opening, which improves the aesthetics of the mobile terminal at the opening.

Figure 10:
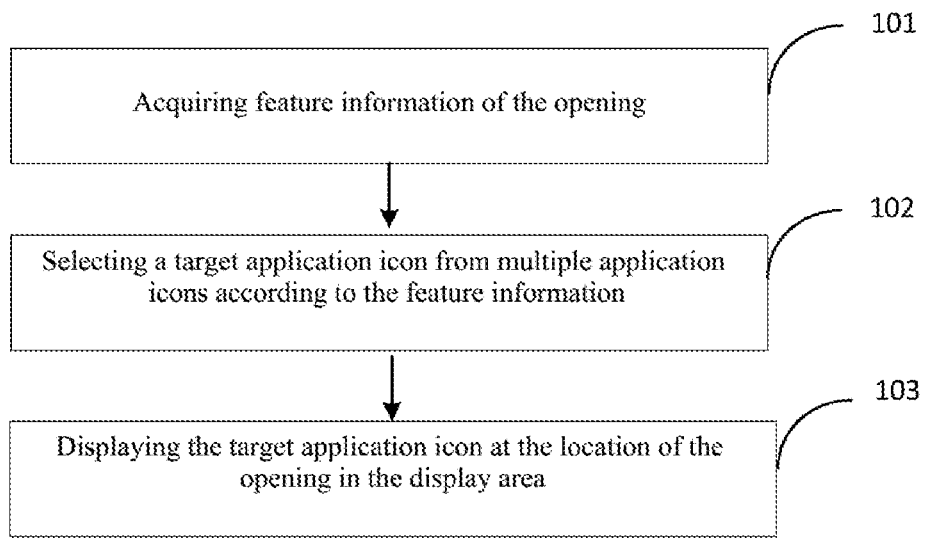
FIG. 10 is a flowchart of a method for display according to some embodiments of the present disclosure.

As shown in FIG. 10, the method may be applied in the mobile terminal as described in the above embodiments, and may include actions/operations in the following.

At 101, the method acquires feature information of the opening.

The mobile terminal includes a display screen, and the display screen defines the opening. To avoid redundant description, the mobile terminal with the display screen and the opening thereof may be referred to the mobile terminal described in FIGS. 1-8.

In some embodiments, the feature information of the opening may include location information and/or shape information of the opening. The location information may be used to indicate the location of the opening in the display screen, and the shape information may be used to indicate the shape of the opening. After the location information and shape information are obtained, a size of an area in the display screen where the opening is located and pixel coordinates in the corresponding area can be determined according to the location information and shape information.

In some embodiments, to obtain the feature information of the opening, the feature information of the opening related to the mobile terminal may be pre-stored in the mobile terminal by the manufacturer before the mobile terminal is shipped from the factory. Alternatively, the feature information of the opening related to the mobile terminal is obtained from the Internet.

Understandably, the specific acquiring process can be set according to the actual requirements.

At 102, the method selects a target application icon from multiple application icons according to the feature information.

The application icons may be application icons generated as corresponding application programs are installed by the user in the mobile terminal, or application icons corresponding to cloud services obtained from a server, which are not limited herein.

In some embodiments, for selecting a target application icon from multiple application icons according to the feature information, an area in the display screen where the opening is located and a size of the area in the display screen where the opening is located can be determined according to the feature information, then, the display information of the application icons is obtained to determine the display characteristics of these application icons, the feature information of the opening is compared with the display characteristics of these application icons, and finally, an application icon matched with the feature information of the opening is adopted as the target application icon.

The target application icon has at least one dark region generated during the display of the application icon. Thus, the opening can be well hidden as the at least one dark region of the target application icon is displayed at the opening.

At 103, the method displays the target application icon at the location of the opening in the display area.

The display at the opening of the display screen refers that a display range of the target application icon in the display screen can exactly surround the opening of the display screen, and achieves the effect of substantially-covering the opening.

In some embodiments, at least one dark region of the target application icon may be set at the location of the opening according to the location of the opening. As at least one dark region of the target application icon generally presents dark colors or has dark lights, and even does not emit light in a normal display process, the opening can be hidden by using feature of at least one dark region of the target application icon.

Specifically, the location of the opening can be obtained, and a location of at least one dark region of the target application icon can be determined. These two locations can be matched to obtain final display coordinates of the target application icon, and the target application icon is displayed at the opening according to the final display coordinates of the target application icon.

As mentioned above, in this embodiment of the present disclosure, the feature information of the opening is obtained, the target application icon is selected from a plurality of application icons according to the feature information of the opening, and the target application icon is displayed at the location of the opening in the display area. In this way, the embodiments of the present disclosure can realize that the opening is hidden in the target application icon, which improves the user's perception, and better utilize an area in the display screen near the opening to improve the utilization rate of the display screen.

Figure 11:
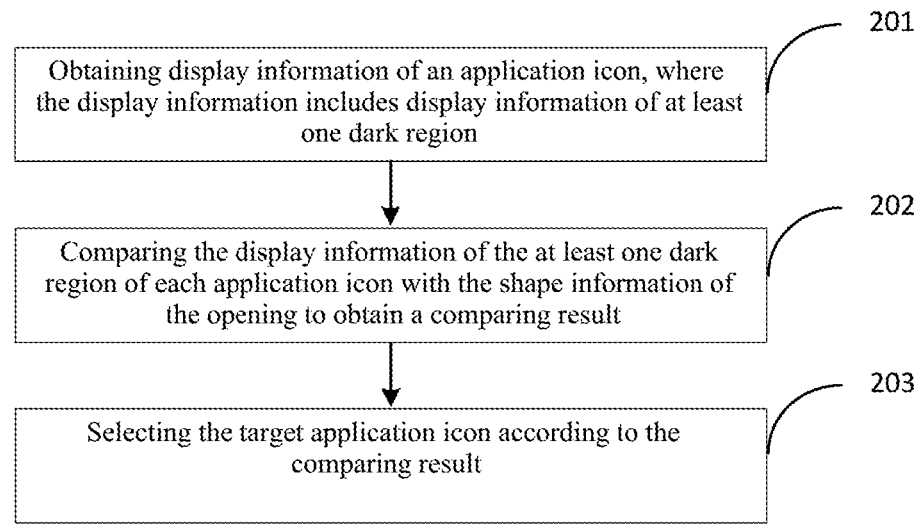
FIG. 11 is a flowchart of selecting a target application icon according to some embodiments of the present disclosure.

As shown in FIG. 11, an embodiment of the present disclosure further discloses an implementation process of selecting a target application icon from multiple application icons according to the feature information of the opening. The feature information of the opening includes the shape information of the opening, and the implementation process specifically includes the following actions/operation.

At 201, display information of an application icon is obtained, where the display information includes display information of at least one dark region.

Figure 12:
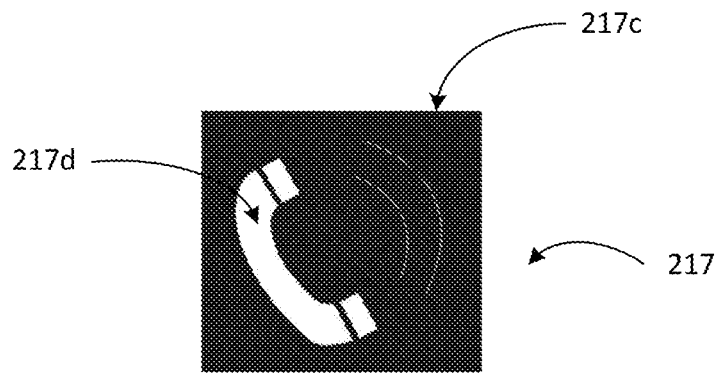
FIG. 12 is another example diagram of application icons for a method for display according to some embodiments of the present disclosure.

As shown in FIG. 12, which shows image features of an application icon 217. The application icon 217 includes a dark region 217c and a bright area 217d. The dark region 217c and the bright area 217d are used to form a pattern within the application icon 217.

The display information of the application icon 217 records the information of each pixel in the application icon 217, mainly including display color of the pixel and a display coordinate of the pixel.

In some embodiments, the dark region 217c may be a region displayed as a dark tone image, the dark tone image may be a black image, or a brown, dark red, or purple image, or a mixed image including two or more dark tone images. Features of the dark region 217c can be known from the display information of the application icon 217. If pixels adjacent to a certain location for the application icon 217 are detected to be displayed as black, a region formed by the pixels adjacent to the certain location is called as the dark region 217c.

In some embodiments, a preset threshold representing the number of pixels may be set to determine whether a region with adjacent black or dark pixels can become the dark region 217c. That is, whether the number of adjacent black or dark pixels in a region is greater than or equal to the preset threshold is determined, and if so, the region is the dark region 217c.

For example, if the preset threshold is set to 50 pixels. If the number of adjacent black or dark pixels in a certain region is greater than or equal to 50, the region can be called as the dark region 217c.

At 202, the display information of the at least one dark region of each application icon is compared with the shape information of the opening to obtain a comparing result.

The shape information of the opening can be used to indicate the shape of the opening.

In some embodiments, the display screen is usually a matrix including multiple pixels, and each pixel has its corresponding display coordinate in the display screen. When a pixel needs to be displayed, the pixel can be displayed at a display coordinate of the pixel in the display screen.

The opening is formed by a groove in the display screen, or a hole-like structure at a reserved location, and a location of the opening should be within a range of the ideal matrix of the display screen. Therefore, as an area occupied by the opening corresponds to display coordinates (which can be understood as pixels that do not respond to signals) of the opening in the corresponding matrix of the display screen, a size of the opening in the display screen can be determined.

In some embodiments, in the process of comparing the display information of at least one dark region of each application icon with the shape information of the opening, the shape information of the opening, such as a length and a width of the opening or the specific location or area, can be converted into the number of pixels occupied in the display screen and the relative location in the display process, and then can be compared with the display information of at least one dark region directly.

In some embodiments, the specific comparison method may include the following.

The method determines a size of each dark region according to the display information of the at least one dark region.

The method determines whether a size of the opening is less than or equal to the size of each of the at least one dark region of the application icon.

A size of a dark region refers to the number of pixels in the dark region of the display screen and the relative locations among multiple pixels.

After the size of the dark region is determined, combined with the shape information of the opening, such as the length and width of the opening or the specific location and area, whether the size of the dark region is greater than or equal to the size of the opening may be determined. If the size of the dark region is greater than or equal to the size of the opening, it can be determined that the area occupied by the opening can be within the area of at least one dark region of the application icon.

For example, if the opening in the display screen is a hole with a radius of 2 mm, one of the at least one dark region of the target application icon has an area greater than or equal to that of the hole.

Therefore, the size of a dark region of an application icon is compared with the size of the opening to more accurately determine whether the application icon is a target application icon that can hide the opening through a dark region thereof.

At 203, the target application icon is selected according to the comparing result.

There may be one or more target application icons.

The target application icon is selected according to the comparing result. That is, an application icon that can hide the opening through a sufficiently large dark region is selected from multiple application icons.

As mentioned above, the display information of the application icon is obtained, and the display information of the application icon includes the display information of at least one dark region. Then the display information of at least one dark region is compared with the shape information of the opening to obtain the comparing result, and a target application icon is selected according to the comparing result. Thus, the target application icon that is more suitable for hiding the opening is determined based on the size of the opening and the size of each dark region in the application icon, which further improves the display effect with hiding the opening.

Figure 13:
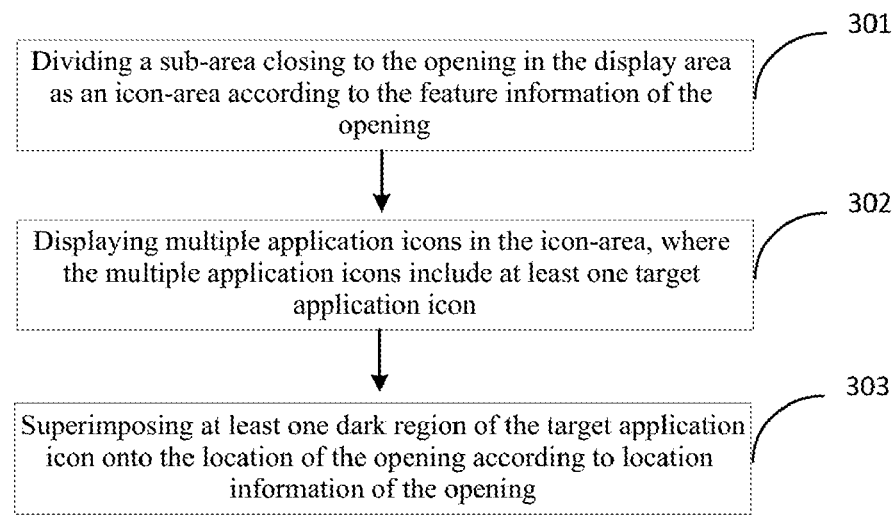
FIG. 13 is a flowchart of displaying a target application icon according to some embodiments of the present disclosure.

FIG. 13 shows an implementation of displaying a target application icon according to some embodiments of the present disclosure.

A process of displaying the target application icon at the location of the opening in the display area may include superimposing at least one dark region of the target application icon onto the location of the opening according to location information of the opening.

The superimposing refers to a location of at least one dark region of the target application icon just covers the opening in the display screen.

The location information of the opening refers to the relative location of the opening in the display screen, i.e., locations of pixels corresponding to the opening in the ideal display matrix of the display screen.

In some embodiments, displaying the target application icon may include actions/operations in the following.

At 301, a sub-area closing to the opening in the display area is divided as an icon-area according to the feature information of the opening.

The icon-area can be used for displaying at least one application icon, and a size of the icon-area can be set according to actual conditions.

Figure 14:
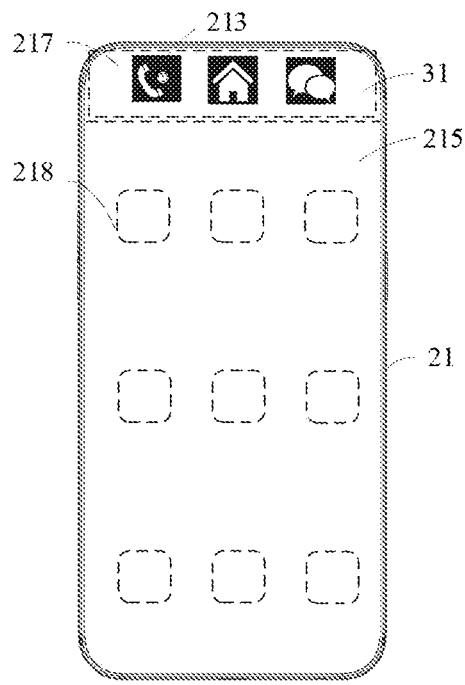
FIG. 14 is an application scenario diagram of a method for display according to some embodiments of the present disclosure.

FIG. 14 shows an application scenario for the method for display according to some embodiments of the present disclosure. In FIG. 14, a mobile terminal includes the display screen 21, the opening 213, and a plurality of application icons including the target application icon 217 displayed over the opening of the display screen.

One or more application icons 218 can also be displayed an area adjacent to the icon-area 31 similarly, and the icon-area 31 is divided to distinguish application icons including the target application from general icons to better manage the displaying of the target application icon. Therefore, the icon-area 31 can be set independently, or can be set integrally with other areas in the display area.

In some embodiments, a background of the icon-area 31 may be switched to a dark background, so that the color of the background is closer to the color of the opening during the displaying of an icon, which further visually hides the opening. It can be understood that the color of the background of the icon-area 31 can be switched independently relative to other areas, or may be switched as the color of the background of the overall display area is switched when the background of the overall display area of the display is switched. The detailed implementation may be set according to actual conditions.

At 302, multiple application icons are displayed in the icon-area, where the multiple application icons include at least one target application icon.

In some embodiments, the application icons displayed in the icon-area 31 may be application icons of highly active applications obtained by counting the number of use times according to user's usage habits of each application in the mobile terminal.

For example, if applications that the user uses most in a certain duration are a weather application, a group purchase application, Weibo, etc., application icons of these applications can be displayed in the icon-area 31.

Alternatively, the application icons displayed in the icon-area 31 may be application icons adjusted based on user's selection.

For example, an icon replacement instruction for the icon-area 31 is provided in the setting menu (such as long-pressing or selecting on an icon in the icon-area 31, or a preset touch key). When the icon replacement instruction is received in the mobile terminal, a part or all of the application icons on the mobile terminal are presented for users to select and replace an application icon.

In some embodiments, application icons in the icon-area 31 are displayed in a rule different from which other application icons are displayed, for example, in an independent arrangement manner and an independent display manner. The arrangement manner may be preset, or switched with users' operations.

In order to hide the opening better, the original application icon can be replaced or converted into an application icon that meets the requirements of the target application icon 217 according to a certain rule, and displayed in the icon-area 31.

Specifically, the rule may be to switch the color of the application icon at the location of the opening to be dark or black, or to directly replace the original application icon through an association relationship, so that the application icon in the icon-area 31 meet the requirements of the target application icon 217.

In some embodiments, during a process of replacing application icons, user may select corresponding target application icons 217, and then these target application icons 217 are arranged in the icon-area 31.

In some embodiments, the background colors of the application icons in the icon-area 31 can also be set to a dark background color to further enhance the visual hiding effect of the opening.

At 303, at least one dark region of the target application icon is superimposed onto the location of the opening according to location information of the opening.

The superimposing refers to a location of at least one dark region of the target application icon just covers the opening in the display screen.

The location information of the opening refers to the relative location of the opening in the display screen, i.e., locations of pixels corresponding to the opening in the ideal display matrix of the display screen.

As mentioned above, the icon-area is set, and application icons in the icon-area are customized. Thus, the hiding effect of the opening in the mobile terminal is greatly improved.

Figure 15:
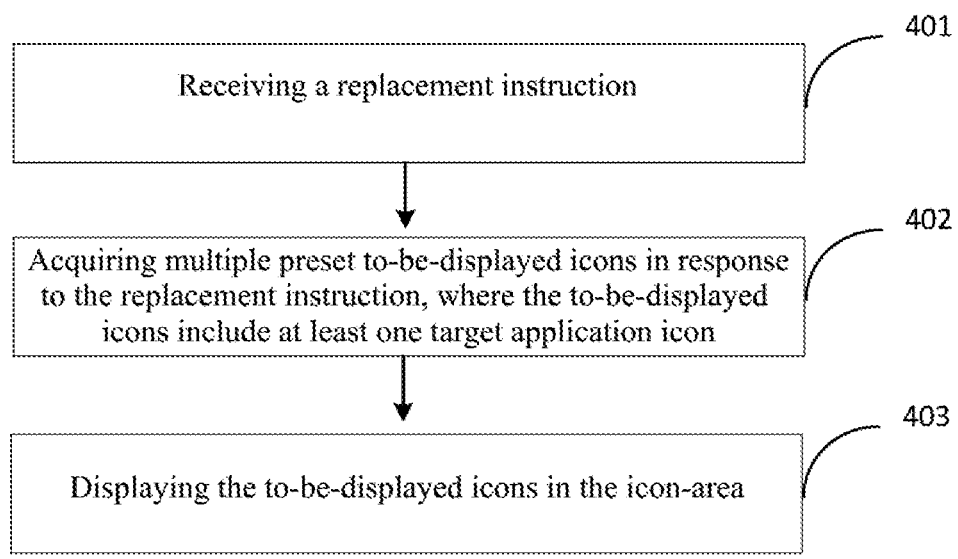
FIG. 15 is a flowchart of replacing application icons according to some embodiments of the present disclosure.

FIG. 15 shows an implementation of replacing a target application icon according to some embodiments of the present disclosure.

After displaying multiple application icons in the icon-area 31, the method further includes actions/operations in following.

At 401, the method receives a replacement instruction.

The replacement instruction is used to indicate to replace the plurality of application icons that are originally displayed in the icon-area 31 to a plurality of preset to-be-displayed icons.

One or more preset to-be-displayed icons may be selected from an application icon list and stored by the user.

In some embodiments, the replacement instruction may be triggered by user's sliding operation or pressing operation on the icon-area 31, or by receiving user's selection operation on a preset button.

It can be appreciated that, the sliding operation on the icon-area 31 means that the icon-area 31 is slid independently. In a case where the icon-area 31 is integrated with other areas, the replacement instruction may also be triggered by sliding other areas.

In some embodiments, the replacement instruction may be triggered by replacing an application icon of a commonly-used application according to user's habits of the application in the mobile terminal. For example, when the weather application is the most frequently-used application within a certain duration, but an instant messaging application becomes the most frequently-used application within another duration, the replacement instruction is triggered. It can be understood that the specific trigger mode of the replacement instruction can be set according to the actual conditions.

When the replacement instruction is triggered, the mobile terminal can receive the replacement instruction.

At 402, the method acquires multiple preset to-be-displayed icons in response to the replacement instruction, where the to-be-displayed icons include at least one target application icon.

In some embodiments, the number of acquired to-be-displayed icons can be obtained by referring to the number of application icons that can be accommodated in the icon-area 31. For example, the icon-area 31 can only accommodate 3 application icons, and only 3 to-be-displayed icons can be obtained after the replacement instruction is received.

In some embodiments, the acquired to-be-displayed icons include at least one target application icon. Alternatively, all acquired icons may be target application icons. Specifically, whether an icon is a target application icon is determined, and when the icon is determined as the target application icon, the icon is marked with a mark. When a to-be-displayed icon is obtained, at least one target application icon can be acquired through these marks.

At 403, the method displays the to-be-displayed icons in the icon-area 31.

In some embodiments, displaying the to-be-displayed icons may be similar to the above-mentioned embodiments. For example, at least one dark region of the target application icon is superimposed onto the location of the opening according to the location information of the opening. In order to avoid redundant description, the specific implementation may refer to the foregoing embodiments.

As mentioned above, when the user switches the application icons in the icon-area, the target application icon from the to-be-displayed icons can be correspondingly replaced at a location of an original target application icon. Thus, the opening can be hidden in the target application icons each time the application icons are switched, effectively ensuring the hiding effect of the opening.

Figure 16:
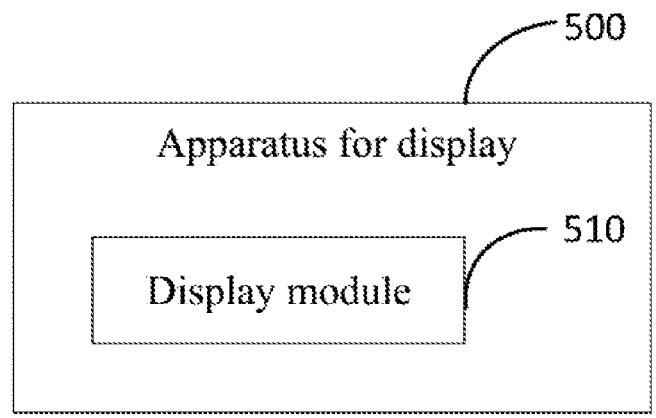
FIG. 16 is a schematic structural diagram of an apparatus for display according to some embodiments of the present disclosure.

As shown in FIG. 16, an apparatus 500 for display is applied in the mobile terminal in the foregoing embodiments and may include a display module 510.

The display module 510 is used for displays the application icon at a location of the opening in the display area, wherein a wall of the display screen surrounding the opening has a projection located in the application icon.

Being at the opening of the display screen may be around the opening in the display area, or a sub-area in the display area having a preset distance from the opening.

In some embodiments, displaying the application icon at a location of the opening in the display area may mean that an image of the application icon is displayed around the opening when the application icon is displayed. It also refers that the opening is totally located in a display range of the application icon. That is, the opening is covered by the application icon. Alternatively, it means that the application icon is displayed on (adjacent to) a side of the opening. That is, a part of the opening is located in the display range of the application icon. Of course, in addition to the above, the position relationship between the opening and the application icon may be determined according to actual conditions.

In some embodiments, the application icon may be displayed at a location of the opening in the display area according to the feature information of the opening. Specifically, a location and/or a size of the opening can be used, so that the mobile terminal can display an application icon that is suitable for hiding the opening at the location of the opening according to the location and/or size of the opening.

In some embodiments, when the opening is set at a location that coincides with a location where the application icon is displayed, an algorithm may be used to enable user to touch a sub-area over the opening in the display area to determine that the user actually selects the application icon corresponding to the location of the opening.

Understandably, the application icon is displayed at the location of the opening in the display area, or the application icon may be displayed near the opening (within a preset range), that is, the opening may not be coincident with the location of the application icon is displayed, which can be determined according to the actual conditions.

Figure 17:
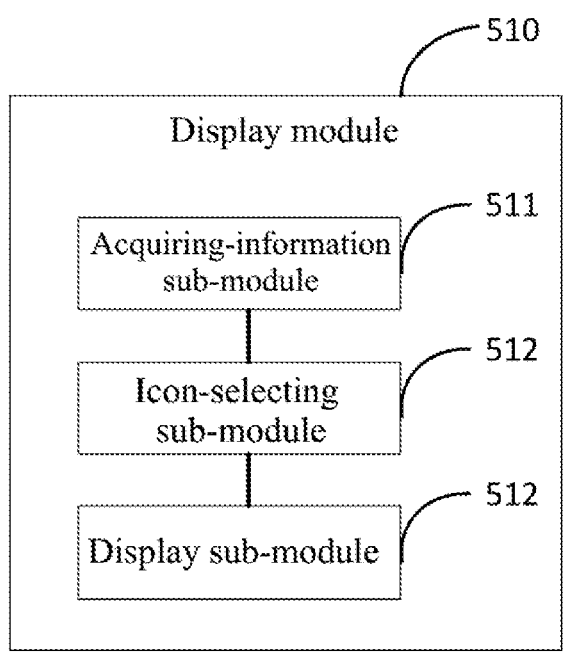
FIG. 17 is a schematic structural diagram of an icon selection module according to some embodiments of the present disclosure.

As mentioned above, as no information can be displayed at the sub-area over the opening in the display area, the method displays the application icon at the location of the opening in the display area. Thus, embodiments of the present disclosure can better utilize an area near the opening in the display screen to display an application icon, which improves the utilization rate of the display screen, and can effectively use the displayed application icon to hide the opening, which improves the aesthetics of the mobile terminal at the opening. As shown in FIG. 17, the display module may include an acquiring-information sub-module 511, an icon-selecting sub-module 512, and a display sub-module 513.

The acquiring-information sub-module 511 is used for acquiring feature information of the opening.

The mobile terminal includes a display screen, and the display screen defines the opening. To avoid redundant description, the mobile terminal with the display screen and the opening thereof may be referred to the mobile terminal described in FIGS. 1-8.

In some embodiments, the feature information of the opening may include location information and/or shape information of the opening. The location information may be used to indicate the location of the opening in the display screen, and the shape information may be used to indicate the shape of the opening. After the location information and shape information are obtained, a size of an area in the display screen where the opening is located and pixel coordinates in the corresponding area can be determined according to the location information and shape information.

In some embodiments, to obtain the feature information of the opening, the feature information of the opening related to the mobile terminal may be pre-stored in the mobile terminal by the manufacturer before the mobile terminal is shipped from the factory. Alternatively, the feature information of the opening related to the mobile terminal is obtained from the Internet.

Understandably, the specific acquiring process can be set according to the actual requirements.

The icon-selecting sub-module 512 is used for selecting a target application icon from multiple application icons according to the feature information.

The application icons may be application icons generated as corresponding application programs are installed by the user in the mobile terminal, or application icons corresponding to cloud services obtained from a server, which are not limited herein.

The target application icon has at least one dark region generated during the display of the application icon. Thus, the opening can be well hidden as the at least one dark region of the target application icon is displayed at the opening.

The display sub-module 513 is used for displaying the target application icon at the location of the opening in the display area.

The display at the opening of the display screen refers that a display range of the target application icon in the display screen can exactly surround the opening of the display screen, and achieves the effect of substantially-covering the opening.

As mentioned above, in this embodiment of the present disclosure, the feature information of the opening is obtained, the target application icon is selected from a plurality of application icons according to the feature information of the opening, and the target application icon is displayed at the location of the opening in the display area. In this way, the embodiments of the present disclosure can realize that the opening is hidden in the target application icon, which improves the user's perception, and better utilize an area in the display screen near the opening to improve the utilization rate of the display screen.

In some embodiments, the display sub-module 513 is specifically used for performing the following actions/operations.

Display information of an application icon is obtained, where the display information includes display information of at least one dark region, the display information of the at least one dark region of each application icon is compared with the shape information of the opening to obtain a comparing result, and the target application icon is selected according to the comparing result.

In some embodiments, the display sub-module 513 is specifically used for performing the following actions/operations.

Determining a size of each dark region according to the display information of the at least one dark region.

Determining whether a size of the opening is less than or equal to the size of each of the at least one dark region of the application icon.

As mentioned above, the display information of the application icon is obtained, and the display information of the application icon includes the display information of at least one dark region. Then the display information of at least one dark region is compared with the shape information of the opening to obtain the comparing result, and a target application icon is selected according to the comparing result. Thus, the target application icon that is more suitable for hiding the opening is determined based on the size of the opening and the size of each dark region in the application icon, which further improves the display effect with hiding the opening.

In a process of displaying the target application icon at the location of the opening in the display area, the display sub-module 513 may be specifically used for superimposing at least one dark region of the target application icon onto the location of the opening according to location information of the opening.

In some embodiments, the display sub-module 513 is specifically used for performing the following actions/operations.

A sub-area closing to the opening in the display area is divided as an icon-area according to the feature information of the opening, multiple application icons are displayed in the icon-area, where the multiple application icons include at least one target application icon, at least one dark region of the target application icon is superimposed onto the location of the opening according to location information of the opening.

The icon-area can be used for displaying at least one application icon, and a size of the icon-area can be set according to actual conditions.

FIG. 14 shows an application scenario for the method for display according to some embodiments of the present disclosure. In FIG. 14, a mobile terminal includes the display screen 21, the opening 213, and a plurality of application icons including the target application icon 217 displayed over the opening of the display screen.

One or more application icons 218 can also be displayed an area adjacent to the icon-area similarly, and the icon-area is divided to distinguish application icons including the target application from general icons to better manage the displaying of the target application icon. Therefore, the icon-area can be set independently, or can be set integrally with other areas in the display area.

In some embodiments, a background of the icon-area may be switched to a dark background, so that the color of the background is closer to the color of the opening during the displaying of an icon, which further visually hides the opening. It can be understood that the color of the background of the icon-area can be switched independently relative to other areas, or may be switched as the color of the background of the overall display area is switched when the background of the overall display area of the display is switched. The detailed implementation may be set according to actual conditions.

In some embodiments, the application icons displayed in the icon-area may be application icons of highly active applications obtained by counting the number of use times according to user's usage habits of each application in the mobile terminal.

For example, if applications that the user uses most in a certain duration are a weather application, a group purchase application, Weibo, etc., application icons of these applications can be displayed in the icon-area.

Alternatively, the application icons displayed in the icon-area may be application icons adjusted based on user's selection.

For example, an icon replacement instruction for the icon-area is provided in the setting menu (such as long-pressing or selecting on an icon in the icon-area, or a preset touch key). When the icon replacement instruction is received in the mobile terminal, a part or all of the application icons on the mobile terminal are presented for users to select and replace an application icon.

In some embodiments, application icons in the icon-area are displayed in a rule different from which other application icons are displayed, for example, in an independent arrangement manner and an independent display manner. The arrangement manner may be preset, or switched with users' operations.

In order to hide the opening better, the original application icon can be replaced or converted into an application icon that meets the requirements of the target application icon 217 according to a certain rule, and displayed in the icon-area.

Specifically, the rule may be to switch the color of the application icon at the location of the opening to be dark or black, or to directly replace the original application icon through an association relationship, so that the application icon in the icon-area meet the requirements of the target application icon 217.

In some embodiments, during a process of replacing application icons, user may select corresponding target application icons 217, and then these target application icons 217 are arranged in the icon-area.

In some embodiments, the background colors of the application icons in the icon-area can also be set to a dark background color to further enhance the visual hiding effect of the opening.

The superimposing refers to a location of at least one dark region of the target application icon just covers the opening in the display screen.

The location information of the opening refers to the relative location of the opening in the display screen, i.e., locations of pixels corresponding to the opening in the ideal display matrix of the display screen.

As mentioned above, the icon-area is set, and application icons in the icon-area are customized. Thus, the hiding effect of the opening in the mobile terminal is greatly improved.

In some embodiments, the display sub-module 513 is further used for performing the following actions/operations.

Receiving a replacement instruction, acquiring multiple preset to-be-displayed icons in response to the replacement instruction, where the to-be-displayed icons include at least one target application icon, and displaying the to-be-displayed icons in the icon-area.

As mentioned above, when the user switches the application icons in the icon-area, the target application icon from the to-be-displayed icons can be correspondingly replaced at a location of an original target application icon. Thus, the opening can be hidden in the target application icons each time the application icons are switched, effectively ensuring the hiding effect of the opening.

In this embodiment of the present disclosure, the apparatus 500 for display belongs to the same conception as the method for display in the above embodiments. The apparatus 500 for display can perform any one method for display in the above embodiments thereon. The specific implementation process is detailed in the embodiments for the method for display, and the optional embodiment of the present disclosure can be formed by any combination, will not be repeated here.

Figure 18:
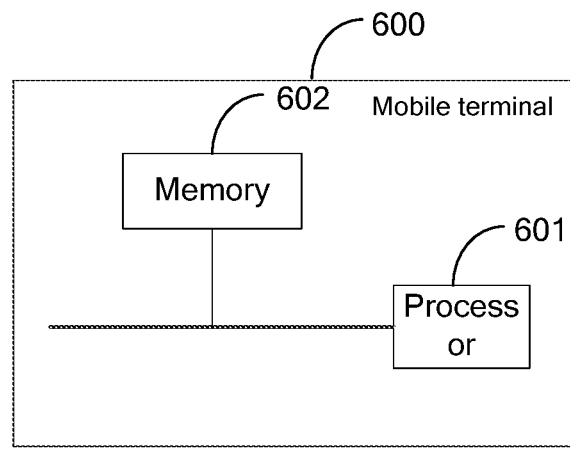
FIG. 18 is a second schematic structural diagram of a mobile terminal according to some embodiments of the present disclosure.

A mobile terminal is further provided in embodiments of the present disclosure, which may be a smart phone, a tablet computer, or the like. As shown in FIG. 18, the mobile terminal 600 includes a processor 601 and a non-transitory memory 602. The processor 601 is electrically coupled to the memory 702.

The processor 601 is a control center of the mobile terminal 600, connected to respective portions of the entire mobile terminal using various interfaces and circuits, and performs various functions of the mobile terminal 600 and data processing by running or loading application programs in the non-transitory memory 602 and invoking data stored in the non-transitory memory 602. Thus, the mobile terminal 600 is monitored as whole.

In this embodiment the processor 601 in the mobile terminal 600 loads the instructions corresponding to a process of one or more application programs into the non-transitory memory 602 according to the following actions/operations, and the application programs stored in the non-transitory memory 602 is executed by the processor 601 to implement various functions.

For example, displaying the application icon at a location of the opening in the display area, wherein a wall of the display screen surrounding the opening has a projection located in the application icon.

In some embodiments, the processor 601 further performs the following:

displaying the application icon at a location of the opening in the display area according to feature information of the opening.

In some embodiments, the processor 601 further performs the following:

acquiring the feature information of the opening, the feature information of the opening comprising at least one of shape information and location information of the opening; and selecting the application icon from a plurality of preset application icons in the mobile terminal according to the at least one of shape information and location information of the opening.

In some embodiments, the processor 601 performs the following:

acquiring display information the at least one dark region of each preset application icon;

comparing the display information of the at least one dark region of each preset application icon with the shape information of the opening to obtain a comparing result; and selecting the application icon according to the comparing result.

In some embodiments, the processor 601 performs the following:

determining a size of each of the at least one dark region of the each preset application icon according to the display information of the at least one dark region of the each preset application icon; and determining whether a size of the opening is less than or equal to the size of the each of the at least one dark region of the each preset application icon.

In some embodiments, the feature information of the opening comprises the location information of the opening, the application icon comprises at least one dark, and the processor 601 performs the following:

Superimposing at least one of the at least one dark region of the application icon onto the location of the opening according to the location information of the opening such that the opening is covered by the application icon.

In some embodiments, the processor 601 performs the following:

dividing a sub-area closing to the opening in the display area as an icon-area, wherein the application icon is located in the icon-area; and displaying at least another application icon in the icon-area.

In some embodiments, the processor 601 performs the following:

receiving a replacement instruction, the replacement instruction being configured for indicating to replace the application icon and the at least another application icon that are originally displayed in the icon-area;

acquiring a plurality of preset to-be-displayed icons in response to the replacement instruction, wherein the plurality of preset to-be-displayed icons comprises at least one application icon that is selected from the plurality of preset application icons according to the at least one of shape information and location information of the opening; and displaying the plurality of preset to-be-displayed icons in the icon-area, wherein one of the at least one application icon is displayed at the location of the opening.

The non-transitory memory 602 can be used to store computer programs and data. The computer programs stored in non-transitory memory 602 contains instructions that can be executed in the processor. Computer programs can form various functional modules. The processor 601 performs various functions and data-processing by calling a computer program stored in non-transitory memory 602.

For example, displaying the application icon at a location of the opening in the display area, wherein a wall of the display screen surrounding the opening has a projection located in the application icon.

Figure 19:
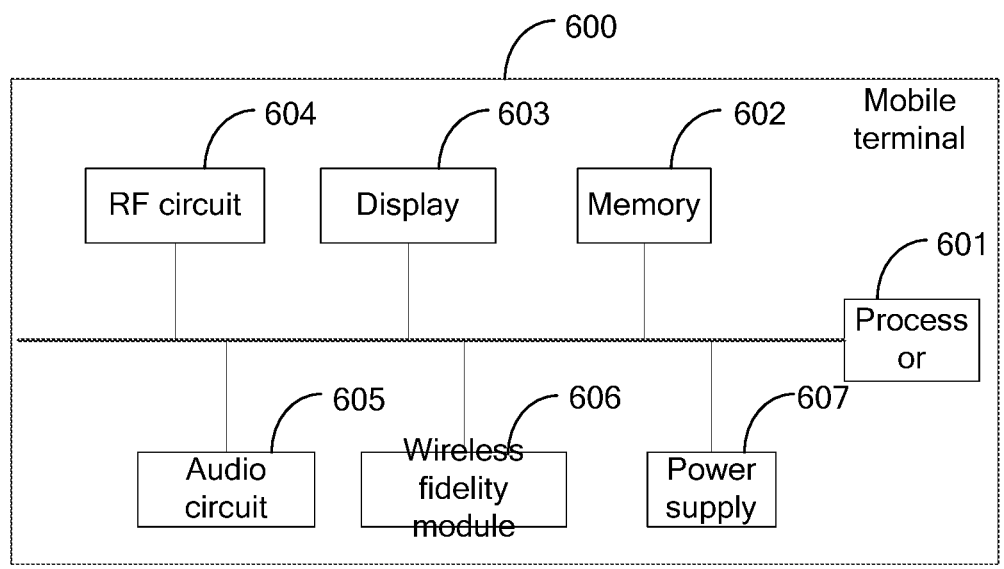
FIG. 19 is a third schematic structural diagram of a mobile terminal according to some embodiments of the present disclosure.

As shown in FIG. 19 together, in some embodiments, the mobile terminal 600 may further include a display 603, a radio frequency circuit 604, an audio circuit 605, a wireless fidelity module 606, and a power supply 607. The display 603, the radio frequency circuit 604, the audio circuit 605, the wireless fidelity module 606, and the power supply 607 are electrically coupled to the processor 601, respectively.

The display 603 can be used to display information input by a user or information provided to a user, as well as various graphical user interfaces, which can be composed of graphics, text, icons, video, and any combination thereof. The display 603 may include a display panel. In some embodiments, a liquid crystal display (LCD), or an organic light emitting diode (OLED) and the like may be used to form the display panel.

The radio frequency circuit 604 can be used to transmit and receive radio frequency signals to establish wireless communication with network devices or other electronic devices through wireless communication to transmit and receive signals with network devices or other electronic devices.

The audio circuit 605 can be used to provide an audio interface between a user and an electronic device through a speaker or a microphone.

The wireless fidelity module 606 can be used for short-range wireless transmission, and help users to send and receive emails, browse websites, and access streaming media. It provides users with broadband wireless Internet access.

The power supply 607 can be used to power various components of the mobile terminal 600. In some embodiments, the power supply 607 can be logically coupled to the processor 601 through a power management system to manage functions through the power management system such as managing charging, discharging, and power management.

Although not shown in FIG. 19, the mobile terminal 600 may further include a camera, a Bluetooth module, and the like, of which details are not described herein.

As mentioned above, as no information can be displayed at the sub-area over the opening in the display area, the method displays the application icon at the location of the opening in the display area. Thus, embodiments of the present disclosure can better utilize an area near the opening in the display screen to display an application icon, which improves the utilization rate of the display screen, and can effectively use the displayed application icon to hide the opening, which improves the aesthetics of the mobile terminal at the opening.

It should be noted that those skilled in the art may understand that all or part of the steps of the foregoing embodiments may be completed by a computer program to instruct related hardware. The computer program may be stored in a computer readable medium, which can include but are not limited to a read only memory (ROM), a random access memory (RAM), magnetic or optical disk.

The method and apparatus for display, the storage media, and the mobile terminal according to embodiments of the present disclosure have been described in detail in the forgoing. The principles and embodiments of the present disclosure are set forth through specific examples herein, and the above description of the embodiments is just to help understand the method of the present disclosure and its core ideas. Meanwhile, for those skilled in the art, according to the idea of the present disclosure, there will be changes in the specific implementation manner and the scope of application. In summary, the contents of this specification are not understood as the limitations of the present disclosure.

What is claimed is:

1. A method for display in a mobile terminal comprising a display screen, the display screen being configured for displaying an application icon, defining an opening, and comprising a display area, and the opening being located in the display area and spaced apart from an edge of the display area, and the method comprising:
    displaying a camera application icon at a location of the opening in the display area,
    wherein a wall of the display screen surrounding the opening has a projection located in the camera application icon, wherein a camera pattern in the camera application icon is displayed in an area of the display area and the opening is located in the area, wherein the camera application icon comprises an inner frame and an outer frame, wherein both the inner frame and the outer frame are axisymmetric and are center-symmetric with a same symmetry-center, and wherein the same symmetry-center of the camera application icon coincides with a center of a shape of the opening.

2. The method as claimed in claim 1, wherein the displaying the camera application icon at the location of the opening in the display area comprises:
    displaying the camera application icon at the location of the opening in the display area according to feature information of the opening.

3. The method as claimed in claim 2, further comprising:
    before the displaying the camera application icon at the location of the opening in the display area according to the feature information of the opening:
        acquiring the feature information of the opening, the feature information of the opening comprising at least one of shape information or location information of the opening; and
        selecting the camera application icon from a plurality of preset application icons in the mobile terminal according to the at least one of shape information and location information of the opening.

4. The method as claimed in claim 3, wherein the feature information of the opening comprises the shape information of the opening;
    each of the plurality of preset application icons comprises at least one dark region; and
    the selecting the camera application icon from the plurality of preset application icons in the mobile terminal comprises:
        acquiring display information of the at least one dark region of the each preset application icon;
        comparing the display information of the at least one dark region of the each preset application icon with the shape information of the opening to obtain a comparing result; and
        selecting the camera application icon according to the comparing result.

5. The method as claimed in claim 4, wherein the comparing the display information of the at least one dark region of each preset application icon with the shape information of the opening comprises:
  determining a size of each of the at least one dark region of the each preset application icon according to the display information of the at least one dark region of the each preset application icon; and
  determining whether a size of the opening is less than or equal to the size of the each of the at least one dark region of the each preset application icon.

6. The method as claimed in claim 3, wherein the feature information of the opening comprises the location information of the opening;
  the camera application icon comprises at least one dark region; and
  the displaying the camera application icon at the location of the opening in the display area comprises:
    superimposing at least one of the at least one dark region of the camera application icon onto the location of the opening according to the location information of the opening such that the projection of the wall of the display screen surrounding the opening is located in the camera application icon.

7. The method as claimed in claim 3, wherein the displaying the application icon at the location of the opening in the display area further comprises:
  dividing a sub-area closing to the opening in the display area as an icon-area, wherein the camera application icon is located in the icon-area; and
  displaying at least another application icon in the icon-area.

8. The method as claimed in claim 7, further comprising:
  after the displaying the at least another application icon in the icon-area:
  receiving a replacement instruction, the replacement instruction being configured for indicating to replace the camera application icon and the at least another application icon that are originally displayed in the icon-area;
  acquiring a plurality of preset to-be-displayed icons in response to the replacement instruction, wherein the plurality of preset to-be-displayed icons comprises at least one application icon that is selected from the plurality of preset application icons according to the at least one of shape information or location information of the opening; and
  displaying the plurality of preset to-be-displayed icons in the icon-area, wherein one of the at least one application icon is displayed at the location of the opening.

9. The method as claimed in claim 7, wherein the icon-area has a background, and the background of the icon-area has a dark color.

10. The method as claimed in claim 9, wherein the opening closes a side of the display screen, and the icon-area is adjacent to the side of the display screen.

11. A mobile terminal, comprising:
  a display screen defining an opening and comprising a display area, the opening being located in the display area and spaced apart from an edge of the display area; and
  a processor configured for executing a computer program to cause the display screen to display a camera application icon at a location of the opening in the display area,
  wherein a wall of the display screen surrounding the opening has a projection located in the camera application icon, wherein a camera pattern in the camera application icon is displayed in an area of the display area and the opening is located in the area, wherein the camera application icon comprises an inner frame and an outer frame, wherein both the inner frame and the outer frame are axisymmetric and are center-symmetric with a same symmetry-center, and wherein the same symmetry-center of the camera application icon coincides with a center of a shape of the opening.

12. The mobile terminal as claimed in claim 11, wherein the opening has feature information comprising at least one of shape information or location information; and
  the camera application icon is selected from a plurality of preset application icons according to the at least one of shape information or location information of the opening.

13. The mobile terminal as claimed in claim 12, wherein the camera application icon comprises at least one dark region; and
  the camera application icon is selected in response to at least one of the at least one dark region of the camera application icon being matched with the shape information of the opening.

14. The mobile terminal as claimed in claim 13, wherein the at least one of the at least one dark region of the camera application icon being matched with the shape information of the opening indicates that the at least one of the at least one dark region has an area greater than or equal to an area of the opening; and
  the at least one of the at least one dark region is superimposed onto the opening.

15. The mobile terminal as claimed in claim 11, wherein the display area has a sub-area closing to the opening, and the sub-area is configured for displaying at least another application icon.

16. The mobile terminal as claimed in claim 15, wherein the sub-area has a background, and the background of the sub-area has a dark color.

17. The mobile terminal as claimed in claim 15, wherein the processor is further configured for executing the computer program to replace the camera application icon and the at least another application icon in the sub-area in response to a replacement instruction.

18. A mobile terminal, comprising:
  a display assembly comprising:
    a display layer having a display area and having an ability of displaying an application icon; and
    a light-shielding layer disposed on the display layer and defining an opening spaced apart from an edge of the display layer, wherein a wall of the light-shielding layer surrounding the opening has a projection on the display layer, and the projection is located in the display area;
  a non-transitory storage medium storing a computer program; and
  a processor configured for executing the computer program to control a camera application icon displayed at the projection such that the opening is covered by the camera application icon,
  wherein a camera pattern in the camera application icon is displayed in an area of the display area and the opening is located in the area, wherein the camera application icon comprises an inner frame and an outer frame, wherein both the inner frame and the outer frame are axisymmetric and are center-symmetric with a same symmetry-center, and wherein the same symmetry-center of the camera application icon coincides with a center of a shape of the opening.

\* \* \* \* \*